United States Patent

[11] 3,610,388

| [72] | Inventor | William Rosenhagen<br>Ossining, N.Y. |
|---|---|---|
| [21] | Appl. No. | 850,947 |
| [22] | Filed | Aug. 18, 1969 |
| [45] | Patented | Oct. 5, 1971 |
| [73] | Assignee | Rowe International, Inc.<br>Whippany, N.J. |

[54] TWO-PRICE TWO-LEVEL BEVERAGE MERCHANDISING MACHINE
15 Claims, 6 Drawing Figs.

| [52] | U.S. Cl. | 194/3 |
|---|---|---|
| [51] | Int. Cl. | G07f 13/00 |
| [50] | Field of Search | 194/3, 13, 103, 73 |

[56] References Cited
UNITED STATES PATENTS
1,194,145  8/1916  Culmer........................ 194/73

*Primary Examiner*—Samuel F. Coleman
*Attorney*—Shenier & O'Connor

ABSTRACT: A beverage merchandising machine having an actuatable shaft coupling which normally provides a direct drive from an input shaft to an ingredient dispensing camshaft to dispense a certain volume of beverage in response to a buy made at a certain purchase price and in which means responsive to a buy made at a lesser price actuates the coupling to speed up the camshaft during the ingredient delivery portion of the input shaft cycle to deliver a reduced volume of beverage.

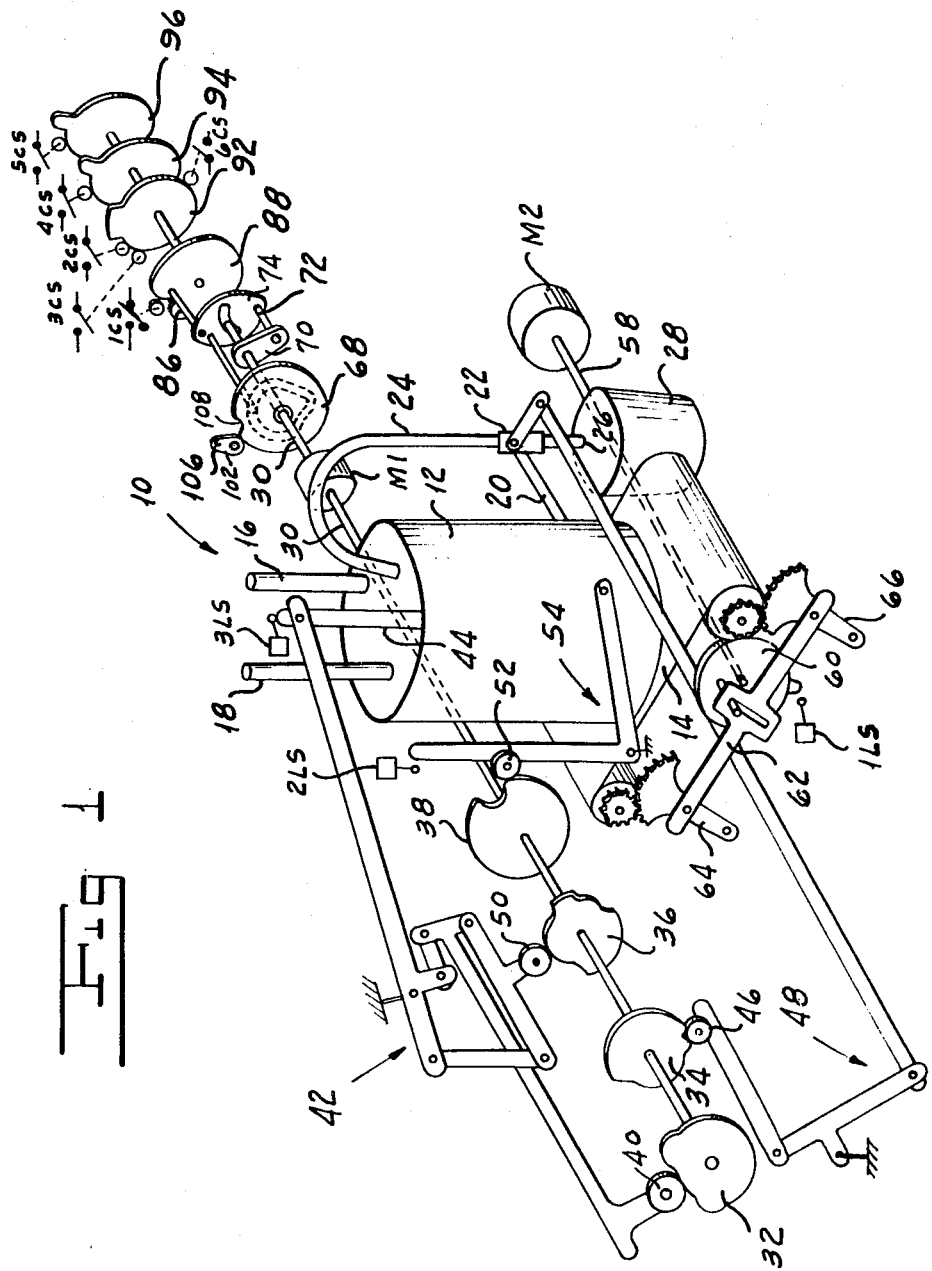

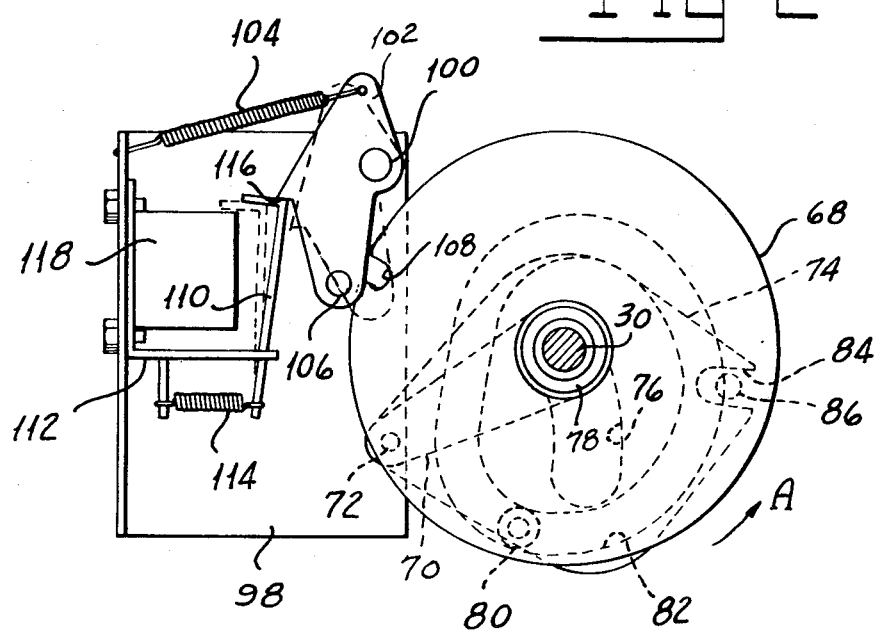
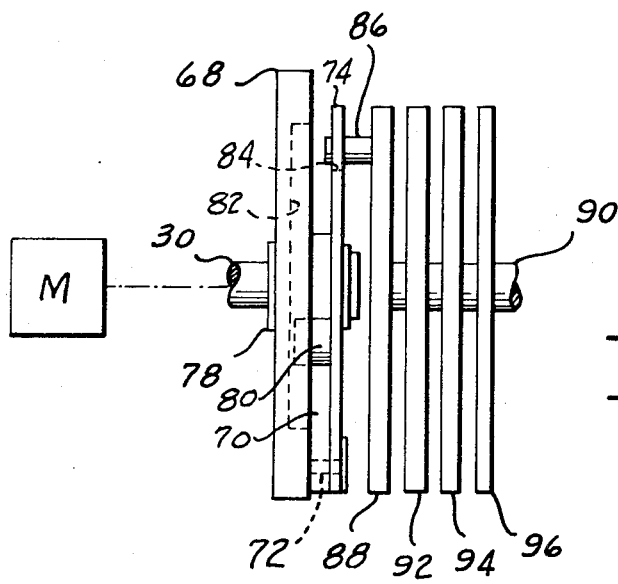

INVENTOR.
William Rosenhagen
BY
Shenier & O'Connor
ATTORNEYS

TWO-PRICE TWO-LEVEL BEVERAGE MERCHANDISING MACHINE

BACKGROUND OF THE INVENTION

Various types of beverage merchandising machines are known in the prior art. For example, there are machines which dispense a variety of hot beverages such as coffee, soup, or hot chocolate. In such machines the most popular beverage is coffee. In the past, these machines were arranged to dispense the various beverages at a single price. In times of inflation, he price at which the beverages are sold can be increased by changing the coin mechanism in a manner known to the art. One problem, however, which as arisen particularly in respect of coffee is resistance on the part of the customer to the price increase and a dissatisfaction on his part that he is unable to purchase coffee for the old price.

One particular beverage merchandising machine is disclosed in Breitenstein et al. Pat. No. 3,429,253, in which individual cups are brewed each time a customer makes a selection. In that machine the operating parts of the brewer are under the control of cams driven by the shaft of the brewer motor. In addition to the cams which control the operations of the brewing chamber itself, there are other cams driven by the brewer motor shaft which control delivery if ingredients such as coffee, water, cream and sugar to the chamber.

I have invented a two-level, two-price coffee brewer which overcomes the problems outlined above of obtaining a fair price for a full cup of coffee while permitting a customer to obtain a smaller cup of coffee at a lesser price. My machine is an improvement over the machine shown in the Breitenstein et al. patent referred to hereinabove. My improvement may be incorporated in that machine without major modifications thereof. It is simple in construction and in operation. It permits the machine to sell a full volume of coffee for one price and a lesser volume of coffee at a lesser price. This result is achieved without substantial modification of either the coin mechanism or the machine proper. The mechanism by which I achieve the above results is of potentially wide application.

SUMMARY OF THE INVENTION

One object of my invention is to provide a beverage merchandising machine which delivers different volumes of beverage in response to deposits of coins aggregating respective sums.

Another object of my invention is to to a two-price, two-level beverage merchandising machine which can be constructed from existing designs without substantial modifications thereof.

A further object of my invention is to provide a two-piece, two-level beverage merchandising machine which is simple in construction and is inexpensive to manufacture.

Still another object of my invention is to provide a variable shaft coupling of general application.

Other and further objects of my invention will appear from the following description.

In general, my invention contemplates the provision of a beverage merchandising machine in which a variable coupling normally provides a direct drive from an input shaft to an ingredient dispensing cam shaft to permit the machine to deliver a certain volume of a beverage in response to the deposit in the machine of a first sum in coins. Means responsive to the deposit of a lesser sum in coins actuates the coupling to speed up the camshaft over a limited part of a revolution of the input shaft to cause the machine to deliver a smaller volume of beverage.

BRIEF DESCRIPTION OF THE DRAWINGS

FIG. 1 is a schematic view of the brewer section of my two-price, two-level beverage merchandising machine.

FIG. 2 is an end elevation of a portion of the control mechanism of my two-price two-level beverage merchandising machine.

FIG. 3 is a side elevation of the variable coupling and camshaft portion of my two-price, two-level beverage merchandising machine.

DESCRIPTION OF THE PREFERRED EMBODIMENT

Figure 4:
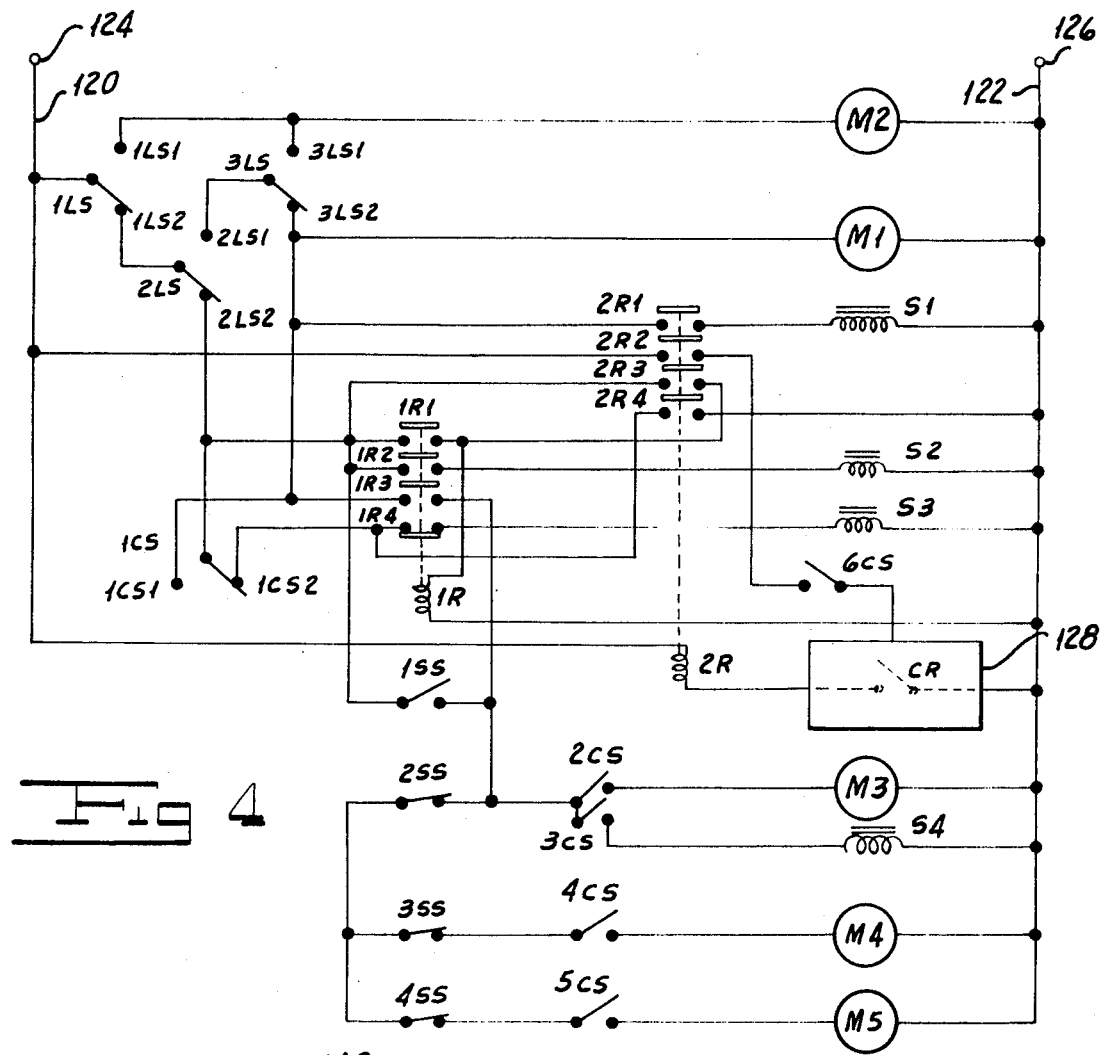
FIG. 4 is a schematic view of one form of an electrical circuit which I may employ with my two-price, two-level merchandising machine.

Referring now to FIG. 1 of the drawings, the brewer section indicated generally by the reference character 10 of my beverage merchandising machines includes a cylinder 12 positioned over a reciprocating filter 14 so as to receive a charge of ground coffee from an inlet duct 16 as well as hot water through a duct 18. A tube 20 connects the interior of the cylinder to a valve 22 adapted to be actuated from a neutral position either to connect the tube 20 to a recirculating tube 24 or to a dispensing tube 26 which delivers coffee to a suitable receptacle such as a cup 28. The brewing mechanism 10 illustrated in FIG. 1 is shown and described in the Breitenstein et al. patent referred to hereinabove. It will be described herein only to the extent necessary to outline the operation of my invention. To control the operation of the brewer, I provide a brewer motor Ml which drives a shaft 30 having a portion extending from one side of the motor which carries respective cams 32, 34, 36 and 38. When the shaft 30 rotates in a manner to be described, cam 32 actuates a follower 40 to drive a linkage indicated generally by the reference character 42 to operate a rod 44 to raise and lower a plunger and piston (not shown) twice during the course of a brewing operation. Cam 34 actuates a follower 46 to drive a linkage indicated generally by the reference character 48 to control the operation of valve 22 in a manner to be described. Cam 36 drives a follower 50 which also actuates linkage 42 to lower rod 44 as required during the brewing cycle. Cam 38 controls the movement of a follower 52 carried by a linkage 54 to raise the cylinder 12 slightly at the end of a brewing cycle.

I also provide the brewer with a motor M2 having an output shaft 58 which drives a crank plate 60 to reciprocate a connecting link 62 to oscillate segment arms 64 and 66 to reciprocate filter 14.

Referring now to FIGS. 1 to 3, I mount a cam 68 loosely on a portion of shaft 30 on the other side of motor Ml from cam 38. The end of shaft 30 extending through the cam carries for rotation therewith an input arm 70 connected by a pin 72 to an output arm 74 formed with an arcuate slot 76 which rides on a hub 78 of the cam. A follower 80 mounted on the output arm 74 rides in a track 82 formed in the cam 68. A slot 84 in the output arm 74 receives a pin 86 carried by a full cycle cam 88 mounted on the camshaft 90 of my machine. Camshaft 90 also carries for rotation therewith a ground coffee and water delivery control cam 92, a sugar delivery control cam 94 and a cream delivery control cam 96.

From the structure just described, it will be appreciated that, when shaft 30 rotates with cam 68 free, a direct coupling is provided to shaft 90 so that it rotates together with shaft 30 at the same speed. If, however, the cam 68 is held so that it cannot rotate with he shaft 30, then follower 80 is constrained to follow the path of the track 82 as the output lever 74 is pulled around by pin 72 when arm 70 rotates in the directions of the arrow A in FIG. 2. In the course of this operation, the arm 74 swings through the arc of opening 76 to determine the amount of advance of rotary movement of arm 74 over the rotary displacement of the input arm 70. Owing to the fact that with cam 68 held, arm 74 is advanced ahead of arm 70 and cam 88, having pin 86 and shaft 90, will be driven faster than is shaft 30 during the period of advance.

A bracket 98 carries a pin 100 which pivotally supports a cam stop 102 for movement between the full line position and the broken line position illustrated in FIG. 2. A spring 104 normally urges stop 102 to a position at which a pin 106 is at a location at which it drops into a peripheral recess 108 in cam 68 to hold the cam. A catch 110 pivotally supported on a bracket 112 normally is urged by a spring 114 to a position at which it engages a nose 116 on the stop 102 to hold it in the full line position shown in FIG. 2. Catch 110 forms the armature of a solenoid 118 which, when energized, moves the armature 110 to the broken line position to release the catch 102.

Referring now to FIG. 4, I have shown one form of electrical circuit which may be used to control my machine. Power to the circuit is provided by respective conductors 120 and 122 leading to the terminals 124 and 126 of a suitable source of voltage. The contact arm 1LS of a limit switch which is actuated once for each revolution of crank plate 60 normally engages a contact 1LS2 and is adapted to engage a contact 1LS1 connected to the filter motor M2, the other terminal of which is connected to conductors 122. I connect contact 1LS2 to the contact arm 2LS of another limit switch which normally engages a contact 2LS2 and which is adapted to engage a contact 1LS1. I connect 2LS1 to the arm of another limit switch 3LS which is actuated by linkage 54 to move it from a contact 3LS2 connected to the brewer motor M1 and which is adapted to engage a contact 3LS1 connected to the filter motor. I connect the contact 2LS2 to the contact arm 1CS of a full cycle switch, operated by cam 88 and connect the contact 3LS2 to contact 1CS1 of switch 1CS. Switch 1CS normally engages a contact 1CS2 and is adapted to be operated to engage contact 1CS1

The control circuit includes a coin register 128 of any suitable type known to the art which in response to a dime's worth of credit passing therethrough closes a normally opened switch CR to connect a transfer relay winding 2R across conductors 120 and 122. Energization of winding 2R closes a plurality of normally opened switches 2R1 to 2R4. It will be understood that if more than a dime's worth of credit is established by register 128, winding 2R is deenergized. Assuming by way of example that the customer is purchasing a normal cup of beverage, winding 2R is momentarily energized. As soon as winding 2R closes contact 2R3, it completes a circuit to the vend relay winding 1R through switch 1LS1, contact 1LS2 switch 2LS, switch 2LS2, switch 2R3 to winding 1R, and from the winding to conductor 122. Energization of winding 1R in this manner closes normally opened switches 1R1 to 1R3 and opens a normally closed switch 1R4.

Closing of switch 1R1 completes a holding circuit for winding 1R by bypassing switch 2R3 so that winding 2R is deenergized upon the establishment of a credit greater than 10 cents. Switch 1R2 closes to energize the select solenoid S2 to permit a selection to be made. The circuit includes a selector switch arrangement including a normally open switch 1SS connected between contact 2LS2 and the vend relay switch 1R3 connected to the brewer motor M1, as well as a plurality of normally closed switches 2SS, 3SS and 4SS. These latter normally closed switches permit the customer to select among regular coffee, black coffee with sugar, black coffee with cream or black coffee without cream or sugar. This will be apparent from the following description.

No matter what selection is made, normally open switch 1SS is closed to complete a circuit for brewer motor M1 from conductor 120 through switches 1LS and 2LS through switch 1SS and through switch 1R3 to the motor M1. As soon as the motor begins to rotate, it moves switch 1CS into engagement with contact 1CS1 to complete its own holding circuit through switches 1LS and 2LS.

In operation of the brewer motor, it drives shaft 30 through 1 revolution to perform a plurality of operations which are more fully described in the Breitenstein et al. patent referred to hereinabove. First, he rod 44 is raised and ingredients are fed to the cylinder 12. The ingredients are delivered in response to the actuation of the coffee and water cam, the cream cam, and the sugar cam, which respectively, operate switches 2CS and 3CS, 4CS and 5CS. Switches 2CS and 3CS sequentially energize the coffee motor M3 and the water solenoid S4 while switches 3CS and 4CS energize the cream and sugar dispensing motors. By way of example, if black coffee with sugar, but not with cream, is desired, switch 3SS opens upon making a selection.

In the course of further rotation of the shaft 30, cam 34 holds valve 22 in its recirculating position. Next, cam 36 lowers rod 44 to recirculate the brewed coffee. Next, the rod 44 is again raised and valve 22 is operated to dispense the beverage in cup 28. Finally, near the end of the dispensing operation, the rod 44 is raised slightly and cam 38 permits the cylinder 12 to be raised. In response to the upward movement of rod 44, switch 3LS is actuated to engage contact 3LS1 to prepare the circuit for the filter motor M2. Now when the cylinder is raised, switch 2LS engages the contact 2LS1 to energize the filter motor M2. When the filter motor begins to drive, it operates switch 1LS to complete its own cycle. It will be appreciated that when this occurs, the brewer motor M1 is deenergized and is not again energized until the filter motor completes its cycle at which time the brewer motor circuit is again complete and it completes its cycle.

The operation described above results in a normal dispensing operation during which a full cup of coffee is dispensed. Considering that a customer wishes to purchase a remains 10 cent cup of coffee, he deposits only a dime and no more in the register 128 so that winding 2R remains energized. As before, relay 1R is then energized and operation of the brewer motor is initiated. However, switch 2R1 remains closed so that the shaft solenoid winding S1 is energized to release latch 102 to permit the pin 106 to hold cam 68. Thus, the motion of the camshaft carrying the ingredient dispensing cams is modified in the manner described above to deliver a lesser amount of coffee. Under these circumstances switch 2R4 remains energized to prevent the coin lockout solenoid S3 from being deenergized upon the opening of switch 1R4. Additionally, switch 2R2 is closed to permit a recycling signal to be sent back to the register 128 when the coffee dispensing cam closes a switch 6CS.

Figure 5:
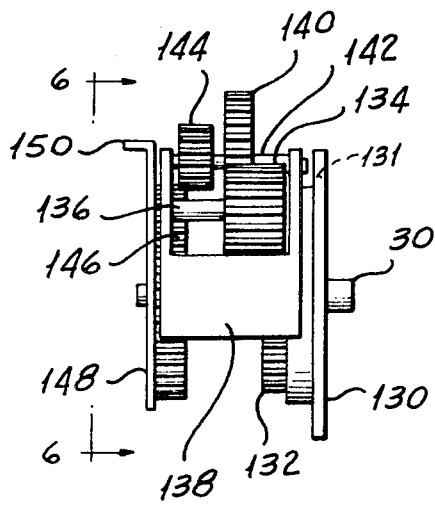
FIG. 5 is a side elevation of an alternate form of control unit for my two-price, two-level beverage merchandising machine.
Figure 6:
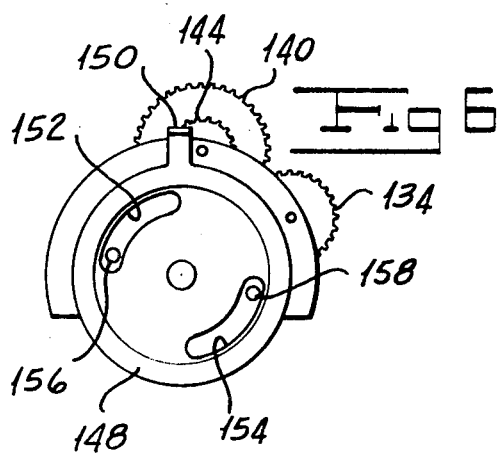
FIG. 6 is an end elevation of the form of control unit shown in FIG. 5.

Referring to FIGS. 5 and 6, I have shown an alternate form of my invention which provides a linear cam phase advance when a 10 cent cup of coffee is being purchased. In this form of my invention, a plate 130 having a peripheral notch 131 is loosely supported on shaft 30. Plate 130 carries for rotation therewith a gear 132 which engages a gear 134 carried by a shaft 136 on a frame 138, carried by shaft 30 for rotation therewith. Gear 134 in turn drivingly engages a gear 140 carried by a shaft 142 on frame 138. A gear 144 on shaft 142 engages a gear 146 on the output plate 148, a projection 150 of which is adapted to engage the full cycle cam of the brewer motor. As long as the plate 130 is free, the output camshaft turns with shaft 30. However, when plate 130 is held, a predetermined advance of plate 38 results, the extent of which is determined by the arcuate extent of slots 152 and 154 in the output plate which receives pins 156 and 158 on the frame 138.

The operation of my coffee machine will be apparent from the description advanced hereinabove. In order to purchase a standard size cup of coffee, the customer deposits at least 15 cents. As soon as a dime is credited winding 2R is energized and is deenergized when more than a dime's worth of credit is established. As a result winding 1R is energized and is held in but winding 2R drops out. Solenoid S1 is not held in and camshaft 90 is driven at the same speed as is shaft 30 and when a selection is made a cup of coffee of normal size is dispensed. If a customer deposits only a dime winding 2R remains energized and solenoid S1 is held in. When a selection is made pin 106 drops into the slot in cam 68 and the cam is held against rotation. Follower 80 is forced to follow the cam track 82 and shaft 90 is accelerated during the beverage component delivery arc of rotation of shaft 30. I so arrange that cam tract that the advance of cam 90 is achieved in two stages. The initial part of the advance is at a relatively greater rate since the coffee switch is operated before the hot water switch. Under these circumstances a smaller cup of coffee is dispensed.

Where I employ the arrangement illustrated in FIGS. 5 and 6 input shaft 30 and shaft 90 are driven at the same speed throughout a revolution so long as plate 130 if free. When that plate is stopped a linear advance of the output shaft with respect to the input shaft results. The extent of the advance is determined by the arcuate extent of slots 152 and 154.

While I have shown and described my invention in connection with a beverage merchandising machine it is to be understood that it may be employed in any installation wherein an output shaft is to be advanced with reference to an input shaft in the course of a revolution of the input shaft.

It will be seen that I have accomplished the objects of my invention. I have provided a beverage merchandising machine which delivers different volumes of beverage in response to deposits of coins aggregating respective sums. My improvement is adaptable to existing machines without substantial modification thereof. It is relatively simple and inexpensive for the result achieved thereby. I have provided a variable shaft coupling of general application.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a merchandising machine, apparatus including means comprising a first shaft adapted to be driven to dispense bulk merchandise, a second shaft, variable coupling means normally coupling said shafts to produce a rotation of said first shaft proportional to the rotation of said second shaft, said coupling adapted to be actuated to vary the connection between said shafts in the course of a revolution of said second shaft, means responsive to deposit in said machine of a first sum for concomitantly driving said second shaft and actuating said coupling and means responsive to deposit in said machine of a larger sum for driving said second shaft.

2. Apparatus as in claim 1, in which said coupling when actuated advances and retards said first shaft relative to said second shaft in the course of a revolution of the second shaft.

3. Apparatus as in claim 1, in which said coupling normally provides a direct connection between said shafts and in which said coupling when actuated advances said first shaft relative to said second shaft in the course of a revolution of the second shaft.

4. Apparatus as in claim 2, in which said first shaft is an output shaft, and in which said second shaft is an input shaft, and in which said coupling comprises an input arm carried by said input shaft for rotation therewith, an output arm supported on said input shaft for limited angular movement relative thereto, a driving connection between said input and output arms, a cam having a track loosely supported on said input shaft, a follower on said output arm in engagement with said cam, a driving connection between said output arm and said output shaft cam normally being free to rotate with said input shaft as said input shaft drives said input arm, and in which said means responsive to said first sum comprises means for concomitantly driving said input shaft and holding said cam against rotary movement whereby said follower is constrained to follow said cam track in response to movement of said input arm, said track being formed to cause said output arm to travel through said limited angular movement and to return in the course of a revolution of said input 5. Apparatus in claim 4, in which said means mounting said output arm on said input shaft comprises means forming an arcuate slot in said output arm, said slot receiving said input shaft.

6. Apparatus as in claim 4, in which said cam is formed with a notch in the periphery thereof and in which said means responsive to said first sum comprises a stop, means mounting said stop adjacent said cam for movement between a first position at which said stop is out of said notch and a second position at which said stop is in said notch, means normally holding said stop in said first position and means responsive to deposit of said first sum for moving said stop to said second position.

7. Apparatus as in claim 1, in which said first shaft is an output shaft and in which said second shaft is an input shaft, and in which said coupling comprises a control gear loosely supported on said input shaft, an output gear carried by said input shaft for limited angular movement relative thereto, a support carried by said shaft for rotation therewith, gearing on said support for coupling said input gear to said output gear, and a driving connection between said output gear and said output shaft and in which said means responsive to said first sum comprises means for preventing rotary movement of said input gear.

8. A merchandising machine for dispensing a brewed beverage made up of ingredients including in combination, brewing apparatus adapted to operate to brew said beverage and to dispense the same, operating mechanism for said brewing apparatus comprising a first shaft, said ingredient dispensing means comprising a second shaft and an actuatable variable coupling between said first and second shafts, drive means for said first shaft, means responsive to deposit of a first sum in said machine for energizing said drive means to cause said brewing apparatus to dispense a first quantity of said beverage, and means responsive to deposit in said machine of a lesser sum for concomitantly energizing said drive means and actuating said coupling to vary the speed of said second shaft in the course of a revolution of the first shaft.

9. A merchandising machine as in claim 8, in which said operating means for said ingredient dispensing means comprises a cam carried by said second shaft for operating said dispensing means during a predetermined portion of a revolution of said second shaft, and in which said coupling when actuated advances said second shaft relative to said first shaft during said predetermined portion of said revolution of said second shaft.

10. A merchandising machine as in claim 8, in which said variable coupling comprises an input element carried by said first shaft for rotation therewith, an output element carried by said first shaft for limited rotary movement relative thereto, a control element loosely carried by said first shaft, actuatable means for restraining said control element against rotary movement means connecting said input arm to said output arm, a coupling between said control element and said output arm for advancing said output arm through said limited angular movement in response to concomitant actuation of said restraining means and movement of said first shaft.

11. A merchandising machine as in claim 10 in which said coupling comprises a cam track in said control element and a follower on said output element located in said track.

12. A merchandising machine as in claim 10, in which said connecting means and said coupling comprises a gear on said input element, a gear on said output element and gearing on said control element interconnecting said input and output gears.

13. A variable coupling for advancing an output shaft relative to an input shaft in the course of a revolution of said input shaft including in combination an input arm carried by said input shaft for movement therewith, an output arm mounted on said input shaft for limited angular movement with respect thereto, means connecting said input arm to said output arm, a control element loosely carried by said input shaft, actuatable means for restraining said control element against rotary movement, a coupling between said control element and said output arm for advancing said output arm through said limited angular movement in response to concomitant actuation of said restraining means and movement of said first shaft and means connecting said output arm to said second shaft.

14. A coupling as in claim 13, in which said coupling comprises a cam track in said control element and a follower on said output element disposed in said track.

15. A variable coupling as in claim 13, in which said means connecting said arms and said coupling comprise an input gear on said input element, an output gear on said output element and gearing on said control element for interconnecting said input and output gears.

PO-1050
(5/69)

UNITED STATES PATENT OFFICE
CERTIFICATE OF CORRECTION

Patent No. 3,610,388         Dated October 5, 1971

Inventor(s) William Rosenhagen

It is certified that error appears in the above-identified patent and that said Letters Patent are hereby corrected as shown below:

Column 5, line 71:
        After "input" insert --shaft.--.

Column 5, line 72:
        After "Apparatus" insert --as--.

Signed and sealed this 16th day of May 1972.

(SEAL)
Attest:

EDWARD M.FLETCHER,JR.        ROBERT GOTTSCHALK
Attesting Officer            Commissioner of Patents